United States Patent
Pendleton et al.

(10) Patent No.: US 10,541,863 B2
(45) Date of Patent: Jan. 21, 2020

(54) PROVISIONING HYBRID SERVICES

(71) Applicant: SHORETEL, INC., Sunnyvale, CA (US)

(72) Inventors: Amy Pendleton, Austin, TX (US); Brian Leipprandt, Austin, TX (US)

(73) Assignee: Mitel Networks, Inc., DE (US)

( * ) Notice: Subject to any disclaimer, the term of this patent is extended or adjusted under 35 U.S.C. 154(b) by 163 days.

(21) Appl. No.: 15/560,082

(22) PCT Filed: Apr. 22, 2016

(86) PCT No.: PCT/US2016/028870
§ 371 (c)(1),
(2) Date: Sep. 20, 2017

(87) PCT Pub. No.: WO2016/172501
PCT Pub. Date: Oct. 27, 2016

(65) Prior Publication Data
US 2018/0083830 A1    Mar. 22, 2018

Related U.S. Application Data

(60) Provisional application No. 62/152,476, filed on Apr. 24, 2015.

(51) Int. Cl.
*H04L 12/24* (2006.01)
*H04L 29/08* (2006.01)
*H04L 29/06* (2006.01)

(52) U.S. Cl.
CPC ........ *H04L 41/0806* (2013.01); *H04L 41/084* (2013.01); *H04L 41/5054* (2013.01);
(Continued)

(58) Field of Classification Search
CPC ..... H04L 51/36; H04L 63/0272; H04L 63/10; H04L 67/10; H04L 67/34; H04M 2203/4509; H04M 2207/20
See application file for complete search history.

(56) References Cited

U.S. PATENT DOCUMENTS

| | | |
|---|---|---|
| 6,215,790 B1 | 4/2001 | Voit et al. |
| 7,289,456 B2 | 10/2007 | Gupta et al. |
| 8,201,237 B1 * | 6/2012 | Doane ................. H04L 63/0272 726/15 |

(Continued)

FOREIGN PATENT DOCUMENTS

WO    WO-2013081953 A1 *  6/2013   ......... H04L 12/4645

*Primary Examiner* — Shean Tokuta

(57) ABSTRACT

A portal application interface can access and provision hosted services configured to operate in a hosted system of a hybrid unified communications system, the hybrid system also including at least one premise-based system. A connection management service (CMS) can store CMS provisioning data in a hosted configuration database of the hosted system in response to a user input via the portal application interface to configure a given premise trunk group of the premise-based system for operation in the hybrid system to provision a session border controller to control at least one connection between the premise trunk group and a hosted trunk group of the hosted system based on the CMS provisioning data. The CMS can update the hosted configuration database to configure the hosted trunk group and cause premise configuration data for the given premise trunk group to be stored in the premise system.

17 Claims, 4 Drawing Sheets

(52) U.S. Cl.
CPC ...... *H04L 41/5096* (2013.01); *H04L 63/0823*
(2013.01); *H04L 67/10* (2013.01); ***H04L
67/1095* (2013.01); *H04L 67/14*** (2013.01);
*H04L 67/20* (2013.01); *H04L 63/10* (2013.01)

(56) References Cited

U.S. PATENT DOCUMENTS

| | | | | |
|---|---|---|---|---|
| 8,291,214 | B2* | 10/2012 | Helfman | ................ H04L 63/20 |
| | | | | 713/153 |
| 8,825,811 | B2 | 9/2014 | Gonzales et al. | |
| 9,306,949 | B1* | 4/2016 | Richard | ............. H04L 63/0272 |
| 9,614,748 | B1* | 4/2017 | Battersby | ......... H04N 21/41407 |
| 9,641,434 | B1* | 5/2017 | Laurence | ............ H04L 45/7453 |
| 9,832,118 | B1* | 11/2017 | Miller | .................... H04L 45/586 |
| 10,212,161 | B1* | 2/2019 | Schaefer | ................ H04L 63/10 |
| 2006/0029032 | A1 | 2/2006 | Allan et al. | |
| 2009/0086742 | A1* | 4/2009 | Ghai | ...................... H04W 36/14 |
| | | | | 370/401 |
| 2010/0027552 | A1* | 2/2010 | Hill | ........................ H04L 12/66 |
| | | | | 370/401 |
| 2011/0075674 | A1* | 3/2011 | Li | ........................... H04L 45/04 |
| | | | | 370/401 |
| 2011/0289134 | A1* | 11/2011 | de los Reyes | .......... H04L 63/20 |
| | | | | 709/203 |
| 2011/0317689 | A1* | 12/2011 | MeLampy | ............. H04L 12/66 |
| | | | | 370/352 |
| 2012/0110156 | A1* | 5/2012 | Guru | .................... H04L 67/125 |
| | | | | 709/223 |
| 2012/0204169 | A1* | 8/2012 | Breiter | ................ G06F 9/44526 |
| | | | | 717/171 |
| 2013/0196697 | A1* | 8/2013 | Lew | ........................ H04W 4/21 |
| | | | | 455/466 |
| 2014/0019516 | A1* | 1/2014 | Banerjee | ................ G06F 9/541 |
| | | | | 709/203 |
| 2014/0157380 | A1* | 6/2014 | Abrams | .................. H04L 67/42 |
| | | | | 726/7 |
| 2014/0280932 | A1* | 9/2014 | Braun | ..................... H04L 63/10 |
| | | | | 709/225 |
| 2014/0325037 | A1* | 10/2014 | Elisha | ................ H04L 41/0806 |
| | | | | 709/220 |
| 2014/0373092 | A1* | 12/2014 | Hussain | .............. H04L 63/0272 |
| | | | | 726/3 |
| 2015/0095497 | A1 | 4/2015 | Caputo et al. | |
| 2015/0372857 | A1* | 12/2015 | Hasan | ................ G06F 16/9024 |
| | | | | 709/220 |
| 2016/0330227 | A1* | 11/2016 | Lindquist | ................ H04L 29/06 |

* cited by examiner

PROVISIONING HYBRID SERVICES

CROSS-REFERENCE TO RELATED APPLICATION

This application claims the benefit of U.S. provisional application No. 62/152,476, filed 24 Apr. 2015, and entitled PROVISIONING HYBRID SERVICES, which is incorporated herein by reference.

TECHNICAL FILED

This disclosure relates generally to provisioning services in a hybrid communications system.

BACKGROUND

Hybrid cloud computing relates to a composition of a cloud network and a private premises network that remain unique entities but are bound together, offering the benefits of multiple deployment models. Such composition can expand deployment options for cloud services, allowing information technology (IT) organizations to use cloud computing resources to meet certain needs. By utilizing "hybrid cloud" architecture, companies and individuals are able to obtain degrees of fault tolerance combined with locally immediate usability without dependency on internet connectivity. Hybrid cloud architecture requires both on-premises resources and off-site (remote) server-based cloud infrastructure.

SUMMARY

This disclosure relates generally to provisioning services in a hybrid communications system.

One example of the invention provides a computer-implemented method, which in response to enabling a connection management service (CMS) of a multi-tenant hosted system for a premise-based system, stores premise and user configuration data associated with the premise-based system in a hosted configuration database of the hosted system. The premise-based system and the hosted system define a hybrid communication system. The method also includes provisioning the CMS in response to a user input to specify users and resource parameters for a premise trunk group of the premise-based system to connect with a hosted trunk group of the hosted system, and corresponding CMS provisioning data is stored in the hosted configuration database. In response to provisioning the CMS, a session border controller is provisioned to control at least one connection between the premise trunk group and the hosted trunk group based on the CMS provisioning data and the hosted configuration database is updated to configure the hosted trunk group based on the CMS provisioning data. Premise configuration data for the premise trunk group is also stored at the premise-based system based on the CMS provisioning data.

As another example, one or more machine readable medium can include instructions. The instructions can include a portal application interface to access and provision hosted services configured to operate in a hosted system of a hybrid unified communications system, the hybrid system also including at least one premise-based system. The instructions can also include a connection management service (CMS) to store CMS provisioning data in a hosted configuration database of the hosted system in response to a user input via the portal application interface to configure a given premise trunk group of the premise-based system for operation in the hybrid system. The CMS further provisions a session border controller to control at least one connection between the premise trunk group and a hosted trunk group of the hosted system based on the CMS provisioning data. The CMS also updates the hosted configuration database to configure the hosted trunk group and causing premise configuration data for the given premise trunk group to be stored in the premise system based on the CMS provisioning data.

A yet another example, a hybrid communication system includes at least one premise-based system, which includes a portal to access and provision enabled hosted services operating in a multi-tenant hosted system of the hybrid unified communications system. The hosted system includes a hosted configuration manager to control configuration and provisioning of the hosted resources in the hosted system, the hosted configuration manager including a connection management service (CMS) to store CMS provisioning data in a hosted configuration database of the hosted system in response to a user input provided via the portal to configure a given premise trunk group of the premise-based system for operation in the hybrid system. A session border controller controls at least one connection between the given premise trunk group and a hosted trunk group of the hosted system based on provisioning of the session border controller according to the CMS provisioning data. The CMS updates the hosted configuration database to configure the hosted trunk group and causing premise configuration data for the given premise trunk group to be stored in the premise system based on the CMS provisioning data.

DETAILED DESCRIPTION

Figure 1:
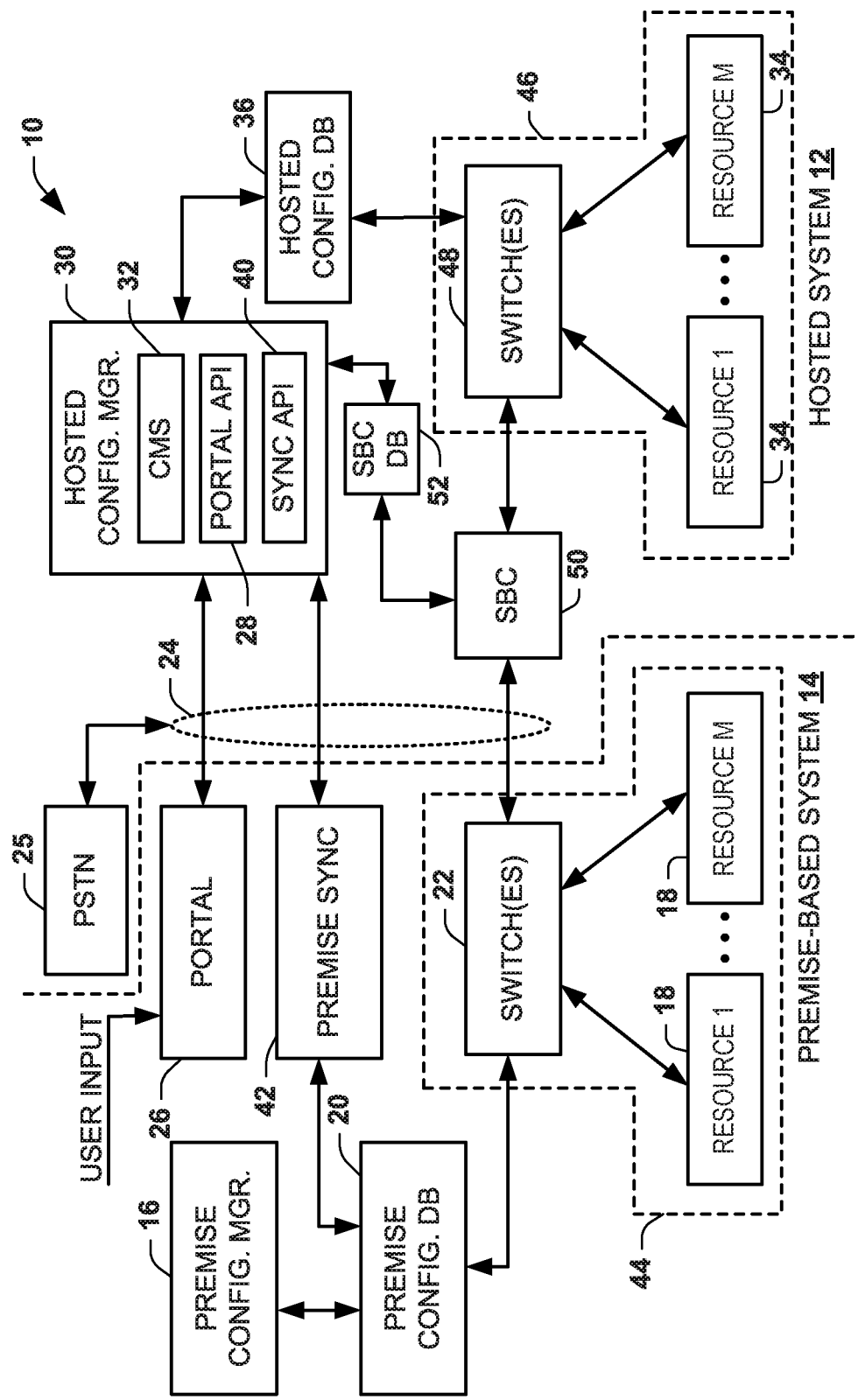
FIG. 1 illustrates an example of a hybrid communications system.

This disclosure relates generally to configuring selected services to facilitate operation of a hybrid communications system. The hybrid system includes a connection management service to manage provisioning and maintaining a dynamic connection between premise-based resources that physically reside in one or more premises-based systems (also referred to herein as a private network) and hosted resources that reside in a hosted system (also referred to herein as a multi-tenant cloud-based system). The management service may be implemented as part of the hosted system to facilitate accounting and billing functions for resources hosted and operating within the hosted system.

As an example, after registering the premise-based system as a given tenant to operate within the hosted system for one or more services, including the management service, and providing identification and related authentication parameters for the premise-based system, an instance of the connection management service can be enabled for the given tenant, including its associated premise-based resources. In response, account and other premise-based configuration information for premise-based resources (e.g., users, user devices, premise hardware and software) can be uploaded from the premise system and stored in a configuration database of the hosted system. To provision the connection management service for the given tenant for which it has been enabled, premise site configuration parameters can be provided in response to a user input. For example, the premise site configuration parameters can specify one or more trunks group (e.g., site, switches and ports) and define extension ranges for each of the premise-based system and in the hosted system. Based on the premise site configuration parameters and related hosted data, configuration data can be provided to provision a session border controller and corresponding hosted resources to enable the connection management service to utilize the SBC and allocated hosted resources. The premise-based system can receive enablement settings data identifying resources in the cloud that are enabled as part of the hybrid system for resources in the premise-based system. For example, the resources can be identified in a directory that includes uniform descriptor data identifying all enabled resources available in the hybrid system for each respective user.

As used herein, the hosted (e.g., cloud) system can be include a variety of hardware and/or software resources that can be supported in a given cloud, including servers, private branch exchanges (PBXs), routers and databases, for example. For example, such resources can include processors, memory, servers, software, applications, that cooperate to provide cloud computing capabilities for users and premise-based systems that desire to exploit cloud resources that enhance existing functionality of their premise-based system. By way of example, each of the plurality of users of the premises system thus can be provisioned individually or as part of a respective group to utilize the hosted resources. As used herein, a premise-based system refers to a private network that is administered and/or operated by or on behalf of a private entity (e.g., a company, group of users, or other service provider) that is different from the entity operating the hosted, cloud-based system. The premise-based system can be implemented locally at a single site or it can be distributed across multiple sites but operated as a single enterprise, such as an enterprise unified communication (UC) system.

As an example, a premise-based system can leverage services of a cloud based PBX and/or cloud based UC system to provide additional services and capabilities to users or other entities of a premise-based PBX/UC system. For example, a cloud service provider can provision, administer, and bill for services that are provided to one or more premises systems and their respective users. With a minimal amount of setup, users or other entities that are generally administered and based at the premises can take advantage of specific cloud based resources for which they have been authorized. In this way, local resources of the premise-based system can remain in a given state or condition, and users of such premises system can employ a network connection (e.g., via a secure communications link) with remote hosted resources (e.g., services and/or hardware implemented in a multi-tenant cloud) to access and utilize, seamlessly, additional resources (e.g., cloud resources). As an example, the premise-based and hosted resources can include extensions, where extensions in the hosted system operate as off-site extensions with respect to the premise-based system and extensions in the premise-based system operate as off-site extension with respect to the hosted system. The extensions listed in the directory remain synchronized as to appear to its users as a set of integrated extensions operating in the UC system.

FIG. 1 depicts an example of a hybrid system 10 that can be implemented. The hybrid system includes a hosted system 12 and a premise-based system 14. In this and other examples disclosed herein, the hosted system 12 can include a multi-tenant cloud system configured to provide cloud-based resources for the premise-based system 14. While one premise-based system 14 is illustrated in FIG. 1, the hybrid system 10 can support any number of premise-based systems, such as in which the hosted system provides a shared set of resources serving a plurality of different tenant customers, as disclosed herein.

In the example of FIG. 1 and other examples disclosed herein, the hybrid system is described in the context of a unified communications (UC) system. The UC integrates real-time communication services (e.g., instant messaging (chat), presence information, telephony, mobility, audio conferencing, contact center functions, video conferencing, data sharing, call control and speech recognition) with non-real-time communication services (e.g., integrated voicemail, transcription services, e-mail, short message service, and fax). It is to be understood that the hybrid system 10 is applicable to other types of computing and/or communication systems in which it is desirable to provision and configure resources operating in a premise-based system (e.g., private network) that is outside of the hosted system yet still enable substantially seamless access and use of cloud-based resources.

The premise-based system 14 can include a premise configuration manager 16 configured to provision the premise-based system. The configuration manager 16, for example, can set parameters for a plurality of resources 18 that operate within the premise-based system, which parameters can be stored in a database 20 of the premises system 14. In addition to resource parameters, in some examples, other configuration data in the database 20 can specify authentication parameters, firewall settings for the user network, session border controller settings and quality of service (QoS) settings for the premise-based system. The types and extent of parameters for the premise-based system 14 can vary depending on the available features, equipment and software running in the premise-based system and hybrid resources in the hosted system 12, such as disclosed herein. In some examples herein, the premise configuration database 20 can store resource parameters in a directory of available resources within the hybrid system regardless of whether they are premise-based or hosted resources.

The premise-based system 14 can implement a variety of private branch exchange (e.g., internet protocol (IP) PBX) resources for implementing communications, including one or more switches 22. Each of the switches 22 include hardware and software programmed to provide switching and routing functions for a particular site (e.g., a business that may include one or more sites). Each switch 22 thus can interconnect various servers and gateways contained in the premise system 14, such as for example implementing a high-speed, non-blocking IP and IP multicast Layer 3 switching and routing.

This is in contrast to a common carrier exchange (e.g., telephone service provider) that operates for many businesses or for the general public. For instance, the switch 22 of the premise-based system 14 can communicate via a network 24 with a service provider operating within a public switched telephone network (PSTN) 25 as well as with resources in the hosted system 12. The switches 22 can be configured to establish communication sessions implementing packet switched calls, such as implementing voice over internet protocol (VoIP), circuit switched calls or a combination of packet and circuit switched communications. In some examples, the switches 22 can implement SIP trunking for VoIP communication sessions.

As mentioned, the premise-based system 14 provides a private network (e.g., an intranet) in the hybrid system 10. For example, the configuration manager 16 can be implemented to include a graphical user interface programmed to access functions and methods to configure and manage the various components of the premise-based system 14.

To access certain functionality of the hosted system 12, the hybrid system 10 can include a portal (e.g., web portal) 26 configured to access a portal application interface (API) 28 via the network 24 (e.g., including the public internet). While the portal is demonstrated as operating in the premise-based system 14, it can be accessed, for example, via a web-based browser or another application operating outside or within the premise-based system 14. In the example of FIG. 1, the portal API 28 is implemented to access functionality associated with a hosted configuration manager 30 of the hosted system 12. For instance, the portal API 28 can expose a selected set of functions of the configuration manager 30 that have been enabled for the premise-based system 14 to establish corresponding hybrid operation between the premise-based and hosted systems 14 and 12, respectively. Initially, the enabled functions can vary according to the stage of configuration and provisioning workflow process, such as disclosed herein.

The API 28 can be utilized to communicate parameters and premise data specifying user properties and/or enable hosted resources. The connection via the portal 26 and portal API 28 of the hosted system 12 can be implemented as a secure communications protocol over the network 24 connection, such as using https or other protocol (e.g., secure shell tunnel). As an example, as part of a set up process for enabling the hybrid system 10, the portal 26 can employ the portal API 28 to create an associated account for the premise-based system 14 and to communicate relevant premise systems parameters that are synchronized between the premise-based system and the hosted system 12. The host system 12 includes a hosted configuration database 36 that can store parameters and premise data for each of a plurality of tenants enabled to operate in the multi-tenant hybrid system 10.

By way of example, in response to creating a tenant account via the portal API 28, a tenant record can be stored in the hosted configuration database 36. For instance, the tenant record can include a unique tenant ID that is automatically generated for each respective tenant, including the premise-based system 14. As part of the initial set up, the hosted configuration manager 30 can create an instance of a synchronization API 40. A premise system synchronization (PREMISE SYNC) component 42 within the premise-based system can employ the premise sync API 40 to communicate with the hosted system via the network 24. The communication between the premise sync component 42 and premise sync API 40 can occur over a secure connection (e.g., a synchronization channel), such as disclosed herein. The synchronization channel can be utilized to communicate information to and from the premise-based system as part of a synchronization process (see, e.g., FIG. 2).

By way of example, the synchronization process can include the premise sync component 42 pulling a unique identifier from the hosted configuration database 36 and pulling a list of enabled services for the premise-based system 14. The premise-based system 14 can also employ the premise sync component 42 to provide user parameters and premise data to the hosted configuration manager 30. The parameters and premise data can include user configuration data, such as specifying user identifiers profiles, such as shown in Table 1. The premise-based system 14 can also provide authentication keys which can include any number of one or more public keys or other information to enable a token or ticket based authentication system for authenticating users and resources of the premise-based system with corresponding services and resources implemented in the hosted system 12. An example of how the authentication keys may be generated and provided to the premise-based system is demonstrated in FIG. 4.

An example of the configuration data that can be stored in databases 20 and 36 for each of the plurality of users is provided below in Table 1.

TABLE 1

| | |
|---|---|
| USERNAME | A user identifier for each user in a given premises system. |
| GUID | Globally unique identifier for the user in both the premises system and the hosted system. |
| DN | A routable Directory Number for a device, user or Workgroup in the premises system. |
| User Type | A field to differentiate between the types of DNs, such as a workgroup and user. |
| First Name | User's first name. |
| Last Name | User's last name. |
| User Email | One or more email addresses for the user. |
| Mobility Username | Username (a shadow username or primary user name) for the user's mobile device(s). |

As an example, the hosted configuration manager 30 can generate a globally unique ID associated with each user's configuration information such as in connection with initial system set up, which can be stored in the database 36. The globally unique ID (e.g., a GUID) can be uploaded (along with other user properties and additional configuration information) to the premise configuration manager 16 via the portal API. The GUID can be unique across all such customer premises systems in the multi-tenant hybrid system 10. When the configuration manager 30 then sets up configuration in the hosted system for a given user, it maintains a mapping between an identity that is established in the hosted system for the premises user and the user's identity in the premises system 14.

As disclosed herein, the hosted configuration manager 30 also includes a connection manager service (CMS) 32 to facilitate inter-operation for communications sessions among or between the premise-based resources 18 and the hosted resources 34. As in response to synchronizing parameters and data between the premise-based system 14 and the hosted system 12 stored respectively in the premise configuration database 20 and the hosted configuration database 36, the CMS 32 can be enabled for the respective premise-based system 14. For example, for purposes of the CMS 32, as disclosed herein, information and configuration data is exchanged between the premise-based system 14 and the hosted system 12 to provide a connection to enable communication between a group of resources, referred to herein as a site corresponding to the premise-based system with a corresponding tenant site within the hosted system. The CMS further enables users to add one or more remote sites to the premise-based system 14 using the hosted system (e.g., the cloud). In the example of FIG. 1, a premise site 44 includes one or more switches 22 and the associated resources 18. Similarly, within the hosted system 12, a hosted site 46 is identified as including one or more switches 48 and corresponding hosted resources 34. The CMS 32 thus is programmed to configure and provision the respective sites 44 and 46 and associated resources within each of the respective systems 14 and 12, respectively, to enable substantially seamless connections between the respective sites and among the respected resources 18 and 34 within the respective sites.

In order to control establishing a communication session for resources 18 and/or 34 either between or external to the sites 44 and 46, the hybrid system 10 includes a session border control (SBC) 50. The SBC 50 is implemented in the signaling and media path between the premise site 44 and the hosted site 46. In the example of FIG. 1, the SBC 50 is demonstrated as residing outside of the private network corresponding to the premise-based system 14 and within the hosted system 12. However, it is understood that the SBC 50 could be implemented as part of either or both systems 12 or 14, or separate from (e.g., outside) either of the systems. For example, the SBC 50 includes hardware and/or software programmed to control signaling (e.g., according to a session initiation protocol (SIP)) and media streams involved in setting up, conducting, and tearing down telephone calls or other interactive media communications.

In order to provide signaling control for signaling and communicating media originating from the premise site 44 or the hosted site 46, the SBC 50 employs an SBC database 52 that includes a corresponding configuration data that has been provisioned to enable hybrid operation. The configuration data in the database 52 includes data for mapping protocol messages to or from one of the switches 22 or 48 in one of the respective sites 44 and 46 to the other corresponding switches 48 or 22. For example, the mapping data can include directional mapping information to map a GUID assigned to a given extension to a corresponding extension identifier assigned in the other site. The SBC 50 thus can modify a SIP header of a signaling message directed to a remote extension (e.g., residing outside of the premise-based system 14) based on the mapping data and to send the modified signaling message to the switch of the other site for distribution to the identified resource. In response to the destination resource accepting the communication and signaling being communicated back to the calling resource, the communication session can be connected for conducting the session between resources (e.g., endpoint extensions) located in the premise site and the hosted site.

By way of example, the switch 22 employs the premise configuration database 20 for directing a communications from one of the premise resources 18 to another of the premise resources (e.g., a given user extension) 18. As an alternative or additional example, the switch 22 employs the premise configuration database 20 for directing a communications from one of the premise resources 18 via the SBC 50 to one or more corresponding hosted resources 34 in the hosted site 46. In the case where the communication is initiated from a premise resource 18 directed to a hosted resource 34, however, from the perspective of the switch 22, the hosted resources 34 appears as remote off-site extensions operating as part of the private network corresponding to the premise-based system 14. That is, due to the provisioning of the CMS 32, the switch 22 does not know that the resources 34 reside in the hosted system 12. Similarly, each switch 48 in the hosted site 46 can direct communications from one of the hosted resources (e.g., endpoints) in the site 46 to one or more different hosted resources 34 in the hosted site via a direct connection by the switch based on the mapping data in the hosted configuration database 36. Additionally or alternatively, each switch 48 in the hosted site 46 can direct communications from one of the hosted resources (e.g., endpoints) in the site 46 to the SBC 50 based on the mapping data in the hosted configuration database 36, and the SBC directs the communication to the switch 22 based on the SBC database 52 for establishing a connection with one or more of the premise resources 18. However, from the perspective of the switch 48 operating within the hosted site 46, communications routed via the SBC 50 to resources 18 in the premise-based system 14 appear as off-site extensions relative to the hosted site 46. Each of the switches 22, 48 can also send protocol messages for calls to and/or from third parties (e.g., messages from one of the switches not directed to resources in the hybrid system 10) to the PSTN 25 via the network 24.

In order to enable connections between resources in the premise and hosted sites 44 and 46, such as mentioned above, the CMS 32 is provisioned accordingly. For example, an authorized user (e.g., an administrator) can provision certain aspects of the CMS 32, including parts of the premise system 14 and the hosted system 12, in response to a user input using the portal 26 for accessing corresponding functions exposed by the portal API 28. As mentioned, the CMS 32 is programmed to implement a service in the hosted system 12 that is enabled for the given premise-based system 14 to establish and maintain one or more connections between the premise site 44 the hosted site 46.

As an example, the user input via portal 26 for provisioning the CMS 32 can include creating a premise trunk group that belongs to the site 44. The trunk group includes one or more selected switches 22 and associated resources 18. For example, CMS 32 can be programmed to specify a corresponding partition (e.g., within a given cluster) of the hosted system 12 that is associated with the tenant ID that has been generated for the specific premise-based system 14. For the corresponding partition that is created within the hosted system 12 associated with the premise system (e.g., via a tenant ID), user inputs via the portal 26 and API 28 further can program one or more premise trunk groups (corresponding to site 44) within the premise-based system 14 to be interconnected via the SBC 50 to the corresponding hosted site 46. The premise system 14 can include one or more sites; however, in some examples, only one premise site 44 is established in provisioning the CMS 32 as a 'CMS site' for purposes of connecting with the hosted system 12 in the hybrid system 10.

As part of a provisioning workflow process, for example, the hosted configuration database 36 can already have stored therein user configuration and parameter data for the premise-based system 14. This can be pushed by the premise sync component 42 during a previous part of the set up process for the hybrid system, for example. The user configuration and parameter data for the premise-based system 14 can include an indication of available sites and, for each respective site, a set of one or more associated switches. In response to another user input, parameter data for each of the switches can specify the number of ports that are available as well as a number of ports to allocate for the respective trunk group that is to define the premise site 44. As mentioned, a user can add any number of switches to be part of the corresponding trunk group corresponding to the premise site 44.

In addition to setting up the premise trunk for the site 44, the CMS 32 can receive user inputs via the portal 26 to specify one or more extension ranges for the set of resources operating in the site 44 and for the set of resources to operate within the hosted site 46. For example, based on the initial configuration information provided via the premise sync function to the sync API 40, the hosted configuration database can include extension data specifying one or more ranges of extension already set for the premise-based system 14. Additionally, in response to user inputs via the portal, one can add or change the premise ranges. Based on the premise extension ranges stored in the hosted configuration database for the premise system (e.g., based on initially provided extension data during the synchronization process described herein), the CMS 32 can determine an appropriate range or ranges of extensions for operating within the hosted system 12 (e.g., adjacent or in between range for the premise system) for use as part of the premise system. Additionally, in response to a user input, a user can add or remove one or more ranges of premise or hosted extensions that are to be utilized in the hybrid system 10. The partition trunk definitions and extension ranges can all be stored as corresponding CMS provisioning data in the hosted configuration database in response to the user input in the portal 26, thereby provisioning the CMS 32 of the hosted configuration manager 30. As disclosed herein, the aggregate set of specified extensions can be stored in a unified directory (e.g., in each of the databases 20 and 36) to facilitate direct extension dialing between resources associated with each of the extensions.

In response of the provisioning of the CMS 32, the hosted configuration manager 30 can employ the CMS provisioning data to provision the SBC 50, such as by storing corresponding trunk data for the premise trunk group established for the premise site 44. The CMS 32 can initiate SBC provisioning automatically in response to user inputs via the portal 26. Such premise trunk data for the site 44 can be stored in the SBC database 52 such as in a table (or other data structure) specifying unique user parameters (e.g., Table 1) and associated extension ranges for each of the premise resources 18. Appropriate certificates for the premise system 14 can also be stored in the SBC database 52 to enable secure access to the services and resources implemented in the hosted system that have been authorized and enabled for the premise-based system 14. The CMS 32 can also update the trunk group data for the hosted site 46, including the one or more switches 48 and the associated hosted resources 34. Since the premise resources 18 operate as remote offsite extensions with respect to the resources in the hosted site 46, the assigned extension ranges stored in SBC data 52 for the premise resources can map to corresponding globally unique IDs defined for each of the respective premise resources 18 to enable connections to such resourced from hosted resources.

The CMS 32 can also provision the trunk group corresponding to the hosted site 46 based on the CMS provisioning data, which provisioning can be initiated automatically in response to user inputs via the portal 26. For example, the CMS 32 can provision remote users with respect to the site 46, including the users associated with the site 44 as well as other users operating elsewhere within the premise-based system 14. This can include specifying user configuration data for each of the remote users operating in the hybrid system 12. The management service can also create an additional table for a corresponding remote offsite extensions corresponding to the premise resources 18. Thus, each of the offsite extensions stored in the hosted configuration database 36 can map to corresponding extensions for the premises resources 18. However, for each of the users of the hosted resources 34 as well as the premise-based resources 18, a unified directory for each of the respective users and their respective extensions are maintained in the hosted configuration database 36, which can be exposed to the users implemented to operate in the hosted site 46.

In order to synchronize and maintain the information for enabling the inter-site connections for sites 44 and 46, the management services can send a message to the premise sync component 42 of the premise-based system 14. The message can be sent in response to provisioning the hosted site 46, for example. Additional notification messages can be sent to the premise sync component in response to detecting changes in the provisioning data stored in the hosted configuration database 36. In response, the premise sync 42 can pull corresponding data via the sync API 40 from the hosted configuration database 36. For example, the premise sync function 42 can pull data that specifies users operating in the hosted system 12, which pulled data can be stored in the premise configuration database 20. The premise sync function 42 can store remote offsite extensions in the premise configuration database 20 to specify a range of extensions for each of the provisioned hosted resources 34 to enable extension dialing and routing from within the premise-based system to the users in the hosted site 46. Additionally, the information entered in response to the user input via the portal 26 for provisioning the CMS 32 is also utilized to configure the corresponding site 44 as a trunk group that includes the specified one or more switches and corresponding resources 18 and associated extension ranges, such as described above. Once the data has been accessed from the hosted configuration database and stored in the premise based configuration database for provisioning the premise site for operation in the hybrid system 10, the corresponding connection between the premise-based system 14 and hosted system 12 can become operational for communication between sites 44 and 46.

Figure 2:
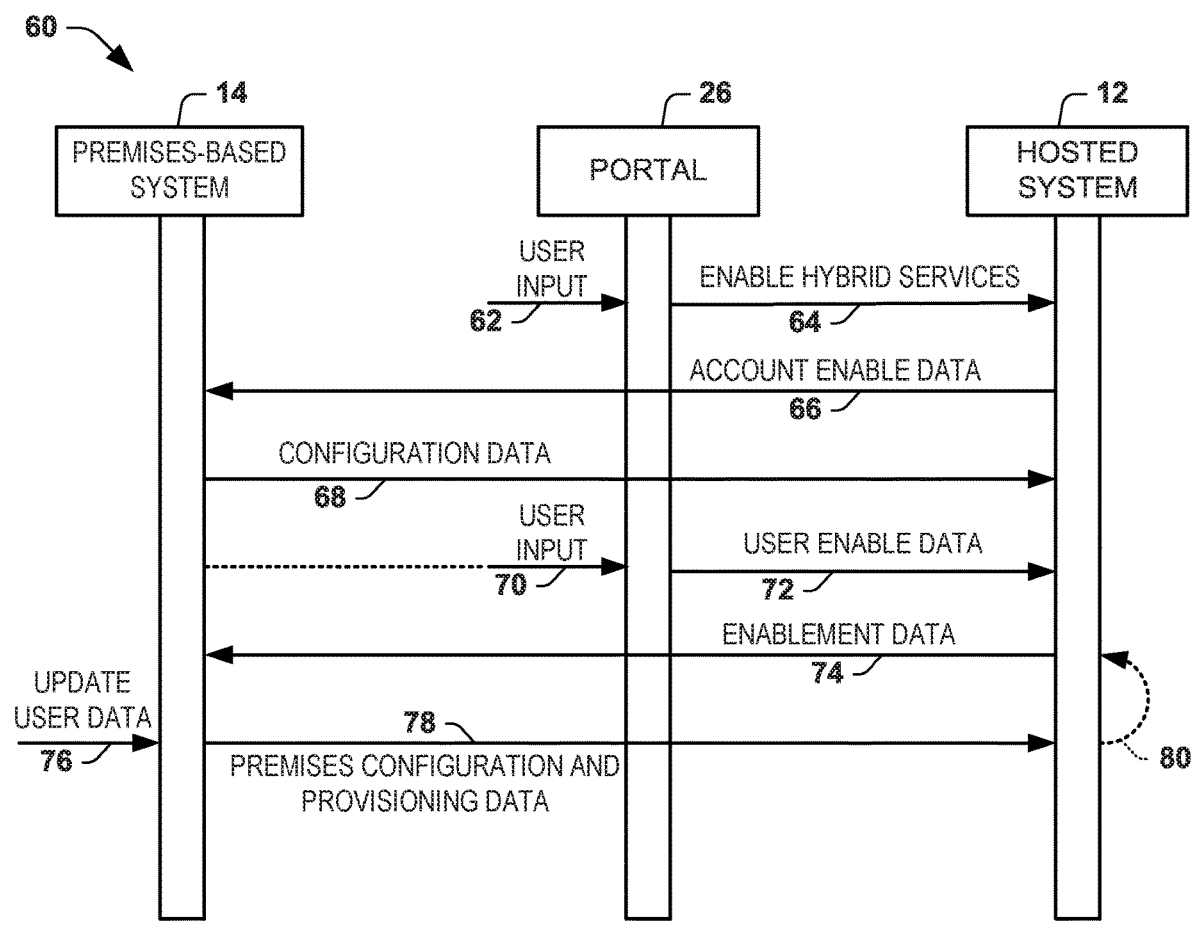
FIG. 2 illustrates an example of a signaling workflow diagram demonstrating signals communicated during part of a provisioning method.
Figure 3:
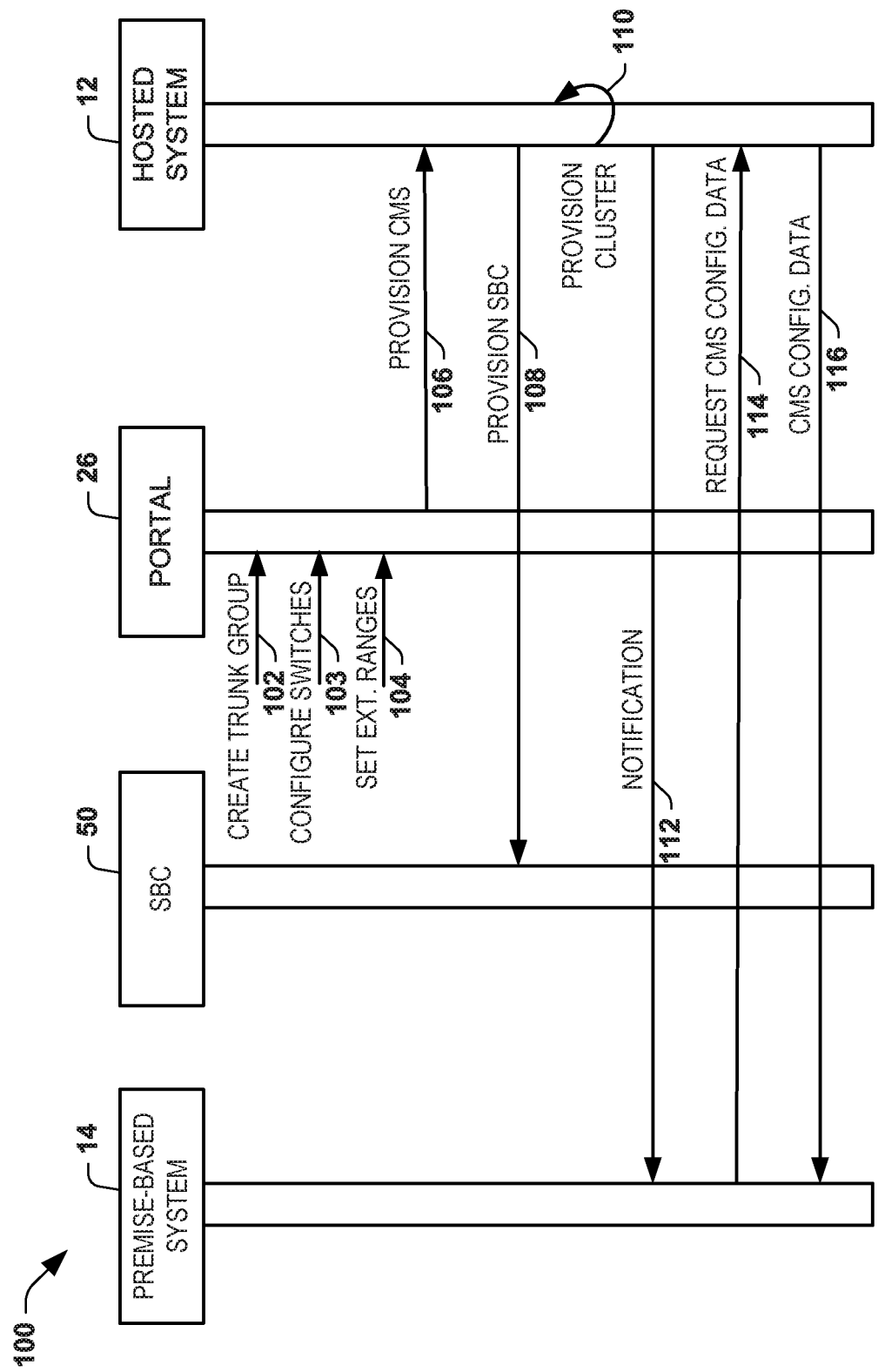
FIG. 3 illustrates an example of another signaling workflow diagram demonstrating signals communicated during another provisioning method.
Figure 4:
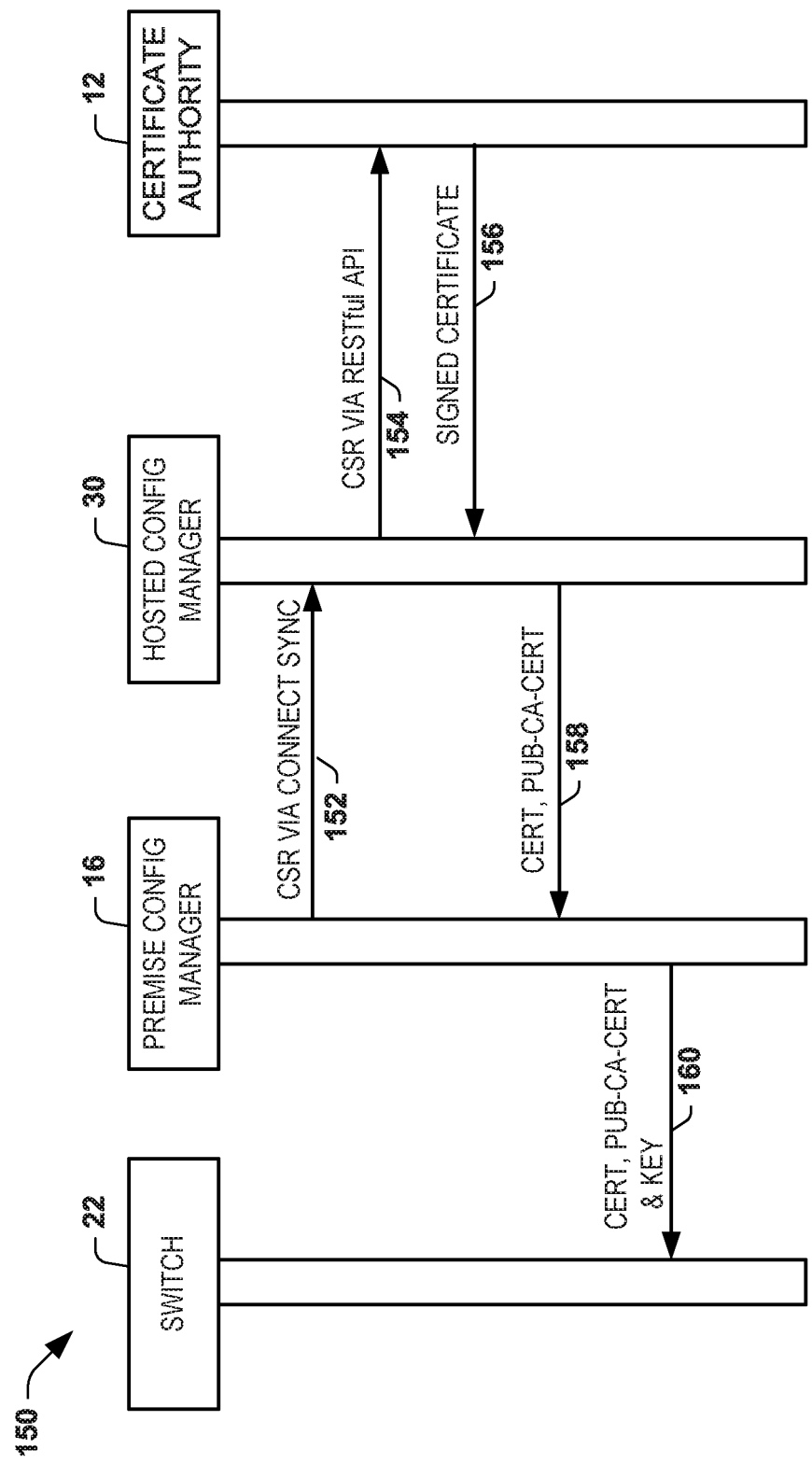
FIG. 4 illustrates an example of a signaling workflow to authenticate a premise site resource to enable secure connection with cloud resources.

FIGS. 2, 3 and 4 illustrate examples of some signaling workflows that can be implemented in the hybrid unified communications system (system 10 of FIG. 1) for performing the various functions disclosed herein. For sake of consistency, the same reference numbers refer to the same parts in the various examples of FIGS. 2, 3 and 4 introduced in relation to FIG. 1. Lines having arrows on both sides are utilized to indicate signaling between multiple devices or bi-directional interaction, whereas a line with a single arrow indicates that communication from one device or user to another.

FIG. 2 illustrates an example of a signaling workflow diagram 60 that demonstrates how resources in the hosted system can be configured for the premise-based system 14. It is further presumed that in the beginning of FIG. 2 that the premise-based system is not operational with the hosted system 12. Reference is made back to the example system 10 of FIG. 1 to provide additional context for the workflow 50.

An authorized user of the premise-based system 14 can log into the portal 26 to register the premise-based system for hybrid operation with the hosted system 12. For example, the authorized user can be provided a predetermined resource location (e.g., a predetermined URL) corresponding to the portal 26. At 62, the user can input an initial set of credentials, such as can include a user name and password. In response to the user input, at 64, hybrid services are enabled, such as by creating a user account for authorizing the premise-based system for hybrid operation with the hosted system 12. In response to the registration of the premises, at 66, the hosted system 12 can provide account enable data to the premise-based system 14. The account enable data can be provided to an administrator, storage location or other authorized person within the premise-based system, such as in a message (e.g., email, SMS message, or the like).

For example, the account enable data at 66 can include a token and an account identifier that can be utilized for further authorization and access to the portal 26 and to the resources within the hosted system 12. The token can be manually entered into the premises system in response to a user input (e.g., typed or copied into a data entry field of a web form). The token in conjunction with the account ID can be utilized to authenticate the respective premise-based system 14 with the hosted system 12. The combination of token and accountability thus can be utilized to secure and identify each premise-based system in the multi-tenant hybrid system 10. The account enable data can include other forms of authentication to enable authorization and access to the portal 26 and to other resources, including services within the hosted system 12, such as ticket-based authentication. One example of ticket based authentication that can be utilized to authorize and enable access to the portal 26 and hosted resources 34 is disclosed in U.S. patent application Ser. No. 14/590,418 entitled DISTRIBUTED AUTHENTICATION, which is incorporated herein by reference.

By way of further example, at 68 the premise-based system 14 can provide configuration data to the hosted system 12 via a secure connection (e.g., premise sync component 42 and sync API 40 of FIG. 1). The connect configuration data can include configurations, properties and user data for each of the plurality of users and resources in the premise-based system. That is, in response to authenticating the premise-based system 14, the entire list of users and user groups for the premises system can be provided to the hosted system 12. As a further example, the authentication mechanism being used can be provided as header information in subsequent messages and communications provided from the premise-based system 14 to the hosted system 12. The configuration data for the users can be generated based on user properties stored in user tables stored in the database 20 of the premise-based system 14.

After the configuration data has been provided at 68 to the hosted system 12 and stored in the configuration database 36, in response to a user input at 70, the authorized user can access the network portal (e.g., using the token and account ID that have been generated for the premise-based system) and corresponding user enable data can be provided to the hosted system 12 to provision various resources for the hybrid users of the premise-based system 14. The user input 70 can be provided by the user to the network portal (e.g., via a web browser) or it can be provided from a GUI implemented at the premise-based system (e.g., as part of the configuration manager 16). For example, as demonstrated by the dotted line associated with the user input 70, the configuration manager 16 of the premises system 14 can provide the user enable data to the portal 26 via the portal API 28, which in turn can be stored in the hosted configuration database 36. The user enable data can enable hosted resources (e.g., resources 18 and 34) for operation with each or a subset of the hybrid users of the premise-based system 14. The user enable data can assign hosted resources to each of the users individually. Alternatively or additionally, hosted resources can be enabled for users according to a group to which each respective user currently belongs. In this way, existing work groups can be leveraged from the premise-based system and utilized for enabling services.

As yet another example, the workflow 50 could be configured to enable an authorized user to enter user input 70 via a GUI implemented directly at the premises system 14 (instead of at the portal 26, as shown). In this other example, the user enable data 72 thus would flow from the premises-based system 14 to the hosted system 12. Since the portal 26 is effectively bypassed in this approach, another mechanism can be employed to securely authorize the user on the premises system for accessing the hosted system 12.

To enable access and use of hosted resources within the hosted system 12, at 64 the hosted system 12 can provide enablement data to the premise-based system 14 based on the user enable data provided via the portal 26. The enablement data thus can specify which resources have been enabled for each user and each identified group of users. By specifying or assigning resources in relation to a respective group, as a user might move from one group to another, the resources for the current group can be dynamically modified for a respective user according to the user's current group.

By configuring the hosted system 12 to control the enablement of resources (e.g., as the source of truth regarding enablement) and in turn providing corresponding enablement data to the premise-based system 14, conflicts can be avoided reducing complexity of the implementation at both the premise-based and hosted systems 14 and 12. Thus, the configuration manager 16 is responsible for a particular set of user settings at the premises system 14, and the hosted system 12 is responsible for another distinct set of user settings to mitigate conflicts as disclosed herein. For example, enablement of hosted resources can be set via the portal 26, whereas other user settings and properties can be managed and controlled via the configuration manager 16 of the premise-based system. The different sets of user parameters cooperate to simplify provisioning and use of hosted resources by the premises system.

As mentioned, if the authorized user modifies configuration properties for one or more users at the premise-based system (e.g., update user data 76), premises configuration and provisioning data can be provided at 78 to the configuration manager of the hosted system 12, such as via the portal API 28. For example, the updated premises configuration and provisioning data can be provided at 78 to the hosted system 12 in response to the database trigger or at a predetermined timing interval from a latest update. The timing interval can be programmable in response to the user input at the premise-based input, for example. The premises configuration and provisioning data that is provided at 78 can in turn utilized to update the configuration database 36, such as demonstrated by dotted line 80. In response to changes resulting from the update, corresponding enablement data may be returned at 74 from the hosted system 12 to the premise-based system 14 via the secure connection. As disclosed herein, different resources in the hosted system 12 can require different provisioning via the configuration manager 16, such as to add or remove the users to utilize different resources.

With reference back to the example of FIG. 1, the configuration manager 16 of the premise-based system can be programmed to enable and disable resources for the respective users via the portal API 28. As mentioned, this can be performed on an individual user basis or on a user group. The portal API 28 can be implemented as a representational state transfer (RESTful) API that can be utilized to export user configuration data to the portal API 28 or as well as to pull settings from the hosted configuration manager, including the enablement data for the users and user groups. In other examples, an authorized user can directly utilize the portal 26 (from within or external to the premises system 14) to modify the enablement properties for users or user groups in the hosted system 12.

FIG. 3 depicts an example of another signaling workflow diagram 100 for provisioning a connection management service (CMS) to configure sites 44 and 46 for connections between resources in the premise-based system 14 and the corresponding hosted system 12. At the beginning of the provisioning process demonstrated in the workflow diagram 100, it is assumed that initial synchronization of parameter and premise configuration data and account setup has already been implemented, such as accomplished according to the workflow disclosed with respect to FIG. 2. Thus, as part of such initial synchronization, the premise-based system (operating as a tenant in the multi-tenant hosted system) is enabled to utilize a set of services enabled in the hosted system according to a subscription for a given tenant, which as has been assigned a unique tenant ID. Additionally, at this stage, the hosted system 12 stores in its configuration database (e.g., database 36) user configuration data (see, e.g., Table 1) as disclosed herein. Additionally, each of the services within the hosted system 12 that has been enabled for the premise-based system 14 received and stored authentication keys to enable secure communication and authenticated usage of such services by the users and other resources of the premise-based system 14.

Turning to FIG. 3, at 102, user inputs are provided via the portal 26 to create a corresponding trunk group for the premise site that is to be connected to the hosted site. The trunk group created at 102 can correspond to a SIP trunk group configured to implement SIP for establishing, maintaining and redirecting connections between respective resources in the premise-based system 14 and the hosted system 12. As a further example, the trunk group user input 102 can specify a corresponding premise site, which can be selected from one or more sites implemented within the premise system 14. At 103, the user input can also specify one or more switches within the selected site that are to be part of the selected site and allocation of such switches for port allocation to the trunk group created at 10). For example, such user inputs can also specify port parameters for each respective switch in the selected site, such as including an identification of a number of available ports (e.g., provided via premise system synchronization of FIG. 2) and the number of ports requested for the selected site. The number of available and requested ports for the switches can be set in response to user inputs.

At 104, extension ranges are set in response to another user input. For example, such extension ranges can be entered via the portal using a well formed document such as an XML or HTML document. The extension ranges, for example, can specify ranges for endpoint extensions (e.g., phone extensions) operating in the hybrid system. The extension ranges can include one or more ranges associated with the premise-based system 14 (e.g., one or more ranges) as well as one or more respective ranges of extensions within the hosted system 12, which collectively define aggregate extension ranges for the hybrid system. Based on the information entered via the portal 26 at 106, the CMS is provisioned based on the configuration data provided at 102 and 104.

In response to the provisioning the CMS 32, the configuration manager of the hosted system 12 can provision the SBC 50, demonstrated at 108. As disclosed herein, the provisioning information for the SBC 50 can be stored in an SBC database (e.g., database 52) and can including configuration data for the premise trunk group that had been specified at 102. Additionally, the SBC provisioning at 108 can include storing corresponding extension ranges for the hosted resources (e.g., resources 34) in the SBC database. The provisioning at 108 can also include adding one or more certificates for the premise trunk group that has been created to enable the corresponding connection between each switch in the trunk group (created at 102) and the SBC 50 (see e.g., FIG. 4). The premise trunk group portion of the provisioning for the SBC at 108 handles communication mapping between the SBC and the premise trunk group, corresponding to resources of the premise site 44.

In addition to the configuration data associated with the premise trunk group (e.g., site 44), the provisioning of the SBC at 108 also includes updating the hosted trunk group configuration data (e.g., for site 46) that has been established for the hosted system 12. The hosted trunk group portion of the provisioning for the SBC at 108 is employed by the SBC to establish, conduct and tear down connections between the SBC and the hosted trunk group, corresponding to resources of the hosted site 46.

For example, the hosted trunk group (e.g., site 46) can be implemented as a shared group of resources used by all tenants that have had the CMS enabled for hybrid operation as disclosed herein. Based on the provisioning of the SBC 50, the SBC operates to map between unique identifiers for each of the resources and corresponding resources in each of the respective trunk groups in the premise-based system 14 and the hosted system 12. The SBC employs the mapping (e.g., stored in SBC database 52) to set up and establish connections for communication session (e.g., calls) between the premise and hosted sites 44 and 46. For instance, the SBC 50 can map calls originating from within the hosted system to resources in the premise system based on the unique identifier associated with an extension set for the destination of the call. Similarly, the SBC can employ the mapping data to map calls placed from resources within the premise-based system to corresponding unique identifiers at resources within the hosted system.

At 110, the hosted system can provision the hosted trunk group, such as by storing corresponding configuration information in the hosted configuration database (e.g., database 36). The provisioning at 110 can include identifying configuration data for each of the premise users according to premise data that has been uploaded to the configuration manager of the hosted system 12. Additionally, the provisioning at 110 can include creating a new table specifying extension ranges (e.g., including one or more ranges of extensions not residing within the premise-based system 14) and mapping of such extensions to corresponding unique identifiers for respective users and respective resources.

The provisioning at 108 and 110 thus corresponds to provisioning for parts of the hybrid system within control of the hosted system 12. At 112, the CMS of the hosted system 12 can provide a corresponding notification to the premise-based system 14. For example, the notification can be provided via a previously established secure channel, such as SSL via an HTML command or other protocol. The notification can trigger the premise-based system to issue a request at 114 to the CMS for corresponding CMS data via a secure communication channel (e.g., an HTTPS, SSL or other secure connection).

In response to the request at 114, the CMS of the hosted system 12 can provide (at 116) corresponding CMS configuration data to the premise-based system 14. The premise-based system 14 can store the CMS configuration data in a corresponding configuration database (e.g., database 20) of the premise-based system. The CMS configuration data, for example, can include an identification of remote users such as including the information identified with respect to Table 1. Additionally, the configuration data can include data specifying a set of remote extension ranges corresponding to one or more ranges of extensions available to users within the premise-based system 14 for accessing corresponding users (e.g., cloud resources) implemented physically in the hosted system 12.

The remote offsite extensions and on-site extensions for the premise-based system 14 can be integrated into a unified directory in the premise configuration database to enable establishing, conducting and tearing down of communication sessions (e.g., calls) from within the premise-based system to any of the users extensions provided in the directory. As mentioned, the CMS configuration data can also include the CMS trunk group data so as to specify resources within a given site of the premise-based system (e.g., site 44). For example, as mentioned, the CMS trunk group can specify switches and ports that have been assigned to the trunk group (e.g., at 102) with sufficient particularity to enable users residing in the group to operate (e.g., place and receive calls). For example, the CMS configuration data can include configuration data identifying switches assigned to the CMS service as well as one or more sites within the premise-based system 14 that are assigned to the CMS. Thus, once the CMS configuration data has been stored into the premise configuration database resources with premise-based system 14 and the hosted system 12 can establish connections via the SBC 50. For example, the one or more switches within the CMS trunk group can connect to the SBC 50 over a secure connection (e.g., via SSL) using a predefined URL for the SBC. The SBC 50 can in turn route calls from the premise-based system to the hosted system based on the mapping table including mapping between unique identifiers stored in the SBC database and corresponding resources (e.g., extensions) in the hosted part of the trunk connection. In this way, the premise CMS trunk group (e.g., corresponding to site 44) and the hosted CMS trunk group (e.g., corresponding to site 46) are connected to each other via the SBC 50.

FIG. 4 depicts an example of another signaling diagram 150 that can be utilized to provide switches within a CMS group corresponding certificates to enable authenticated operation for establishing connections via the SBC 50. In response to the CMS service being enabled, such as disclosed herein, at 152, the configuration manager of the premise system 14 can issue a certificate signing request (CSR) to the hosted configuration manager, such as via the connection via the premise sync component 42 and the sync API 40. At 154, the hosted configuration manager 30 can in turn forward the CSR to a corresponding certificate authority. For example, the request can be issued at 154 via a RESTful API. In response, at 156, the certificate authority can provide the corresponding signed certificate to the hosted configuration manager 30. The hosted configuration manager 30 can store the signed certificate in the hosted configuration database 36 for sending to the premise configuration manager. The premise configuration manager 16 can employ the premise sync component 42 to in turn pull the certificate and along with public certificate authority certificate, as demonstrated at 158. The premise configuration manager 16 can store the issued certificate, the public-CA certificate from the hosted configuration manager along with any associated key to the switch or switches 22, at 158, that have been configured with the CMS premise trunk group (e.g., corresponding to premise site 44). The one or more switches 22 thus can utilize the new key pair (e.g., including the certificates and corresponding key) for authenticated secure connections with the SBC and other hosted services (e.g., including CMS 32) that have been enabled for users and other resources of the premise-based site.

In view of the foregoing, an approach to facilitate provisioning of hybrid system resources is disclosed. As mentioned, such provisioning includes provisioning cloud and premise-based resources in response to minimal user interaction. For instance, after initial premise information is uploaded via secure channels associated with system set up, CMS connection can be provisioned in response to minimal user inputs specifying premise site and associated premise site resource parameters. As a result, the hosted site 46 and its associated resources can be implemented as part of a virtual private cloud within the hosted system 12, including hosted site resources 48 and 34 that afford increased quantity of extensions for extending the premise system to include cloud users. Cloud users can be assigned for the premise system in response to assigning an existing or new user (e.g., in response to use input via the premise configuration manager) an extension that is the one or more extension ranges implemented in the hosted site 46. The administrator or other authorized users may not be aware that the range of extensions to which one or more users is assigned is hosted in a multi-tenant cloud.

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to illustrations of methods, signaling workflow diagrams, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or methodologies, but one of ordinary skill in the art will recognize that many further combinations and permutations are possible. For example, while some examples disclosed herein may seem to describe a primarily premises-based system that can leverage a hosted deployment of resources, the systems and methods disclosed herein can employ various combinations of differing amounts of hosted and premises-based resources according to user requirements. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer-implemented method comprising:
   in response to enabling a connection management service (CMS) of a multi-tenant hosted system for a premise-based system, storing premise and user configuration data associated with the premise-based system in a hosted configuration database of the hosted system, the premise-based system and the hosted system defining a hybrid communication system;
   provisioning the CMS in response to a user input to specify users and resource parameters for a premise trunk group of the premise-based system to connect with a hosted trunk group of the hosted system, CMS provisioning data being stored in the hosted configuration database;
   in response to provisioning the CMS,
      provisioning a session border controller to control at least one connection between the premise trunk group and the hosted trunk group based on the CMS provisioning data;
      updating the hosted configuration database to configure the hosted trunk group based on the CMS provisioning data; and
      storing premise configuration data for the premise trunk group based on the CMS provisioning data,
   wherein prior to enabling the CMS, the method further comprises establishing a premise synchronization link for authenticated communication between a premise configuration manager of the premise-based system and a hosted configuration manager of the hosted system.

2. The computer-implemented method of claim 1, wherein the provisioning of the CMS further comprises:
   creating the premise trunk group for a selected premise site in response to the user input, the premise trunk group to connect with the hosted trunk group for a communication session including a resource in the selected premise site and a resource in a corresponding hosted site that includes the hosted trunk group; and
   creating extension ranges to define extensions that are enabled for the hybrid communication system in response to another user input.

3. The computer-implemented method of claim 2, wherein the extension ranges for the hybrid communication system include at least one extension range for the premise-based system and at least one extension range for the hosted system, at least one of which is specified in response to extension information provided via an extension user input.

4. The computer-implemented method of claim 2, wherein the updating of the hosted configuration database further comprises generating a directory of the extensions for users and resources in the hybrid communication system, the directory including a mapping table for mapping between unique identifiers for system resources within the hybrid communication system and, extensions associated with the system resources within the hosted system.

5. The computer-implemented method of claim 4, wherein the extensions in each extension range for the premise-based system stored in the directory of the hosted configuration database define remote off-site extensions with respect to the hosted site, and
   wherein the extensions in each extension range for the hosted system stored in the directory of the premise configuration data define remote off-site extensions with respect to the selected premise site.

6. The computer-implemented method of claim 2, wherein creating the premise trunk group further comprises:
   specifying at least one switch in the selected premise site to connect with the hosted site; and
   setting port parameters for each specified switch.

7. The computer-implemented method of claim 2, storing provisioning data in the premise configuration database to define at least one range of off-site extensions for the premise-based system, at least one of the off-site extensions corresponding to cloud-based users provisioned in the hosted site for operation with the premise-based system in the multi-tenant hosted system.

8. The computer-implemented method of claim 1, wherein the premise configuration data, which is stored in response to provisioning the CMS, is pulled from the hosted configuration database via the premise synchronization link, the configuration data defining user parameters and corresponding premise configuration data for a CMS premise site that includes the premise trunk group.

9. A non-transitory computer readable medium storing machine readable instructions comprising:
   a portal application interface to access and provision hosted services configured to operate in a hosted system of a hybrid unified communications system, the hybrid system also including at least one premise-based system; and
   a connection management service (CMS) to store CMS provisioning data in a hosted configuration database of the hosted system in response to a user input via the portal application interface to configure a given premise trunk group of the premise-based system for operation in the hybrid system, the CMS further to provision a session border controller to control at least one connection between the given premise trunk group and a hosted trunk group of the hosted system based on the CMS provisioning data, the CMS to update the hosted configuration database to configure the hosted trunk group and causing premise configuration data for the given premise trunk group to be stored in the premise-based system based on the CMS provisioning data,
   wherein, in response to another user input via the portal application interface, the CMS is further configured to store CMS premise site parameters for the given premise trunk group for a selected premise site in the CMS provisioning data, the CMS premise site parameters specifying at least one switch in the selected premise site that is to connect to the session border controller for communications with resources in the hosted trunk group via the session border controller.

10. The medium of claim 9, wherein, in response to an extension user input via the portal application interface, the CMS is further configured to store at least one range of extensions for resources in the premise-based system as part of the CMS premise site parameters for the given premise trunk group.

11. The medium of claim 10, wherein the CMS is further configured to store at least one range of extensions for hybrid resources implemented in the updated hosted configuration database in response to the extension user input.

12. The medium of claim 11, the updated hosted configuration database further comprises a directory of the extensions for users and the resources in each of the premise-based system and the hosted system in the hybrid system, the directory including a mapping table for mapping between unique identifiers for system resources within the hybrid system and extensions associated with the system resources within the hosted system.

13. The medium of claim 12, wherein the extensions in each extension range for the premise-based system stored in the directory of the hosted configuration database define remote off-site extensions with respect to the hosted system, and wherein the extensions in each extension range for the hosted system stored in the directory of the premise configuration data define remote off-site extensions with respect to the selected premise site.

14. The medium claim 10, wherein the CMS is configured to trigger storage of provisioning data in the premise configuration database to define a set of off-site extensions for premise-based system, at least one of the off-site extensions corresponding to at least one cloud-based user or resource provisioned in the hosted system for operation with the premise-based system in the hybrid system.

15. The medium of claim 14, further comprising a premise synchronization application interface to provide authenticated communication link between a premise configuration manager of the premise-based system and a hosted configuration manager of the hosted system, wherein the premise configuration data, which is stored in response to provisioning the CMS, is pulled from the hosted configuration database via the authenticated communication link, the premise configuration database defining user parameters and corresponding premise configuration data for a CMS premise site that includes the given premise trunk group.

16. A hybrid communication system comprising:
at least one premise-based system includes a portal to access and provision hosted services operating in a multi-tenant hosted system of the hybrid unified communications system;

the hosted system includes a hosted configuration manager to control configuration and provisioning of hosted resources in the hosted system, the hosted configuration manager including a connection management service (CMS), which is enabled for the premise-based system, to store CMS provisioning data in a hosted configuration database of the hosted system in response to a user input provided via the portal to configure a given premise trunk group of the premise-based system for operation in the hybrid system;

a session border controller configured to control at least one connection between the given premise trunk group and a hosted trunk group of the hosted system based on provisioning of the session border controller based on the CMS provisioning data, the CMS updating the hosted configuration database to configure the hosted trunk group and causing premise configuration data for the given premise trunk group to be stored in the premise-leased system based on the CMS provisioning data, and a premise synchronization communication link to provide an authenticated connection between a premise configuration manager of the premise-based system and the hosted configuration manager of the hosted system, wherein the premise configuration data, which is stored in response to provisioning the CMS, is pulled from the hosted configuration database via the premise synchronization communication link, the premise configuration database defining user parameters and premise configuration data for a CMS premise site that includes the given premise trunk group.

17. The system of claim 16, wherein the updated hosted configuration database further comprises a directory of extensions for users and resources in each of the premise-based system and the hosted system of the hybrid communication system, the directory including a mapping table for mapping between unique identifiers associated with system resources configured to operate within the hybrid communication system and extensions associated with the system resources within the hosted system, wherein the extensions in each extension range for the premise-based system stored in the directory of the hosted configuration database define remote off-site extensions with respect to the hosted system, and wherein the extensions in each extension range for the hosted system stored in the directory of the premise configuration data define remote off-site extensions with respect to a premise site selected in response to a selection user input.

\* \* \* \* \*